Sept. 12, 1950
G. C. RAY ET AL
2,522,059
SEPARATION OF HYDROCARBONS
Filed Feb. 24, 1947
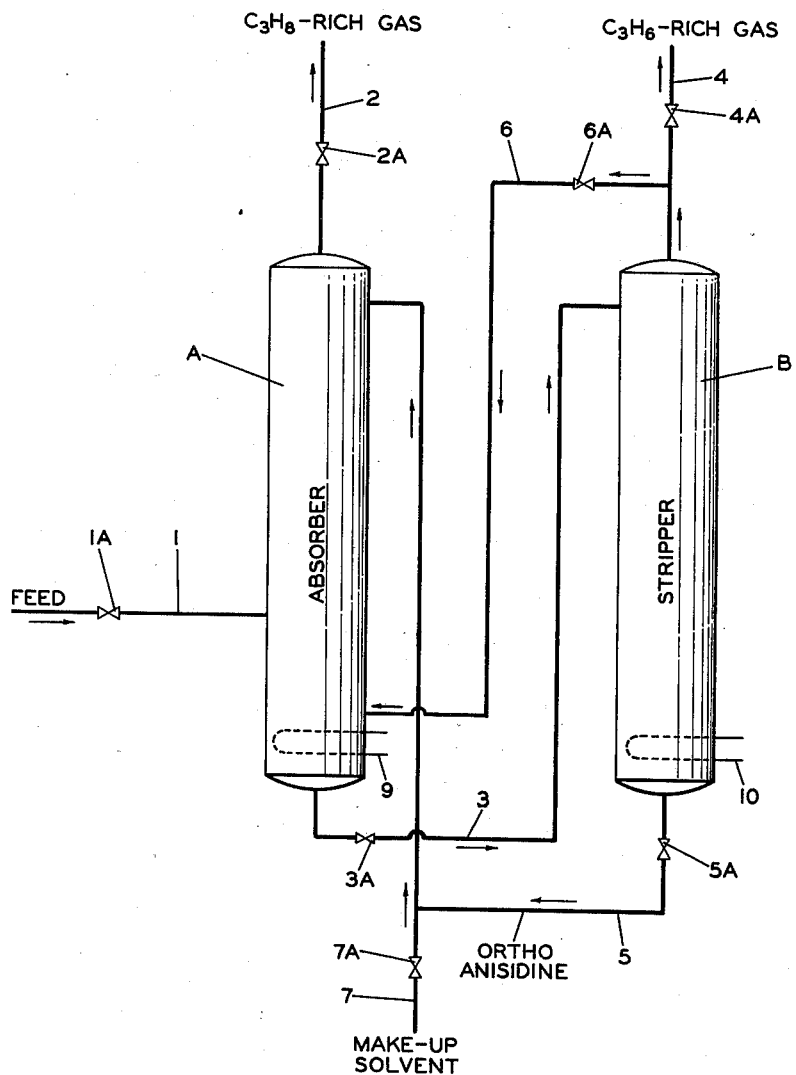
INVENTORS
G. C. RAY
E. O. BOX, JR.
BY
Hudson and Young
ATTORNEYS

Patented Sept. 12, 1950

2,522,059

UNITED STATES PATENT OFFICE 2,522,059

SEPARATION OF HYDROCARBONS

Gardner C. Ray and E. O. Box, Jr., Bartlesville, Okla., assignors to Phillips Petroleum Company, a corporation of Delaware Application February 24, 1947, Serial No. 730,490

5 Claims. (Cl. 183—115)

This invention relates to the separation of the components of normally gaseous or normally liquid aliphatic hydrocarbon mixtures by the use of a suitable selective solvent. In one of its aspects it relates to the separation of gaseous olefin from gaseous paraffin hydrocarbons. In one of its more specific aspects it relates to the separation of ethylene and/or ethane from methane. In some instances, however, when desired, it may be applied to paraffin-paraffin or olefin-olefin separations. It is particularly applicable to the separation of olefins and paraffins of the same molecular weight since it is expensive to separate these compounds by fractional distillation.

The principal object of the present invention is to provide an improved process for the separation of aliphatic hydrocarbon mixtures. Another object is to provide an improved process of separating normally gaseous aliphatic hydrocarbon mixtures. Another object is to provide such a process for the separation of aliphatic hydrocarbons of different degrees of saturation. Another object is to provide such a process for separating aliphatic hydrocarbons having different numbers of carbon atoms per molecule. Another object is to provide an improved method of separating ethylene or ethane or both from methane. Another object is to provide an improved method of separating ethylene from ethane. Another object is to provide an improved method of separating propylene from propane. Numerous other objects will more fully appear as this description proceeds.

The accompanying drawing portrays diagrammatically one arrangement of equipment for separating propane and propylene in accordance with the present invention.

The process of our invention comprises the contacting of a hydrocarbon mixture with ortho anisidine in an absorption zone under such conditions of temperature and pressure that a portion of the hydrocarbon mixture is dissolved in the ortho anisidine. The hydrocarbon-rich ortho anisidine is then sent to a stripping zone wherein the ortho anisidine is stripped of dissolved gases. The hydrocarbon-lean ortho anisidine from the stripping zone is suitable for returning to the absorption zone for reuse in contacting fresh gas feed, thus making possible a continuous process. Gases taken overhead from the stripper are enriched with respect to the hydrocarbon component which is more soluble in the ortho anisidine whereas gases taken overhead from the absorption zone are enriched with respect to the hydrocarbon component which is less soluble in the ortho anisidine.

Under conditions of elevated temperatures normally liquid hydrocarbons may be separated by the process of our invention. The process of our invention is executed preferably with the hydrocarbon mixture in the gas phase. In the case of normally liquid hydrocarbon mixtures, they are preferably converted to gaseous phase before introduction into the absorption or scrubbing zone. Any suitable method of contacting the gaseous hydrocarbon mixture with the liquid ortho anisidine may be employed. The preferred procedure is to contact counter-currently the gaseous hydrocarbon mixture with the liquid ortho anisidine in a tower provided with bubble plates or other contact elements such as packing, baffles, etc. The ortho anisidine is fed continuously into the top of the tower. It is preferred to operate the absorption zone at superatmospheric pressures but in general at pressures below those which cause liquefaction of the hydrocarbon phase. The stripping zone is suitably operated at atmospheric, superatmospheric or subatmospheric pressures. The preferred pressures for the stripping zone are in the range of 0.5 to 2.0 atmospheres absolute. The stripping and absorption zones may both be operated at convenient temperatures. Preferably the temperature of operation is such that the hydrocarbon phase is gaseous. Preferred operating temperatures are in the range of 50 to 250° F., but suitable temperatures cover a much wider range, depending upon the pressures used and the liquefaction points of the hydrocarbon mixtures being separated.

We have discovered that ortho anisidine shows a considerable selectivity as regards its power for dissolving gaseous hydrocarbons, thus making it suitable for use as a selective solvent for enriching certain hydrocarbon mixtures with respect to one or more components.

Our invention is based on the discovery that a satisfactory separation of a mixture of aliphatic hydrocarbons of different types or of different numbers of carbon atoms per molecule or being both different in type and in numbers of carbon atoms per molecule (typified by the separation of methane from ethylene and/or ethane which is difficult to accomplish without resort to expensive refrigeration) may be obtained by treating such a mixture in the gaseous state with a selective solvent consisting of ortho anisidine. When such mixtures of hydrocarbons are maintained in the gaseous state and contacted with ortho anisidine, the more unsaturated and/or the heavier hydrocarbon portion of the mixture is preferentially dissolved in the ortho anisidine while the more saturated and/or the lighter hydrocarbon portion is preferentially rejected by the solvent. After carrying out the contacting step, under suitable conditions of temperature and pressure, the liquid and gaseous phases are separated from one another. The gaseous phase will be found to be impoverished in the more unsaturated and/or higher-boiling hydrocarbon content of the original mixture. The hydrocarbon dissolved in the ortho anisidine solvent may then be recovered by any means known to the art, usually by stripping by application of heat with or without simultaneous reduction of pressure.

Our invention may be employed to separate aliphatic hydrocarbons of differing degrees of saturation. Examples are separation of: monoolefins from paraffins; diolefins from paraffins; diolefins from mono-olefins; acetylenes from more saturated hydrocarbons; etc. Our invention may also be used to separate hydrocarbons having different numbers of carbon atoms per molecule, a particular example being the separation of methane from ethylene or ethane or a mixture of ethylene and ethane which is very troublesome and expensive to accomplish by conventional means such as absorption, fractional distillation and similar processes which require a prohibitive amount of refrigeration.

Specific examples of commercially important separations which may be effected by our invention are: ethane from methane; ethylene from methane; ethane and ethylene from methane; ethylene from ethane; propylene from propane; butadiene from butylene; butylene from butane; pentene from pentane; etc. Our invention may also be employed to separate ethylene from a mixture of ethylene, ethane and methane in a single tower, which is a most unusual separation.

The aliphatic hydrocarbons which may be separated by the present invention will usually be composed of normally gaseous hydrocarbons namely those having from one to four carbon atoms per molecule; however aliphatic hydrocarbons heavier than $C_4$ may be present in the feed. Mixtures of heavier than $C_4$ aliphatic hydrocarbons may be resolved by means of the process of our invention. While generally the present invention will not be applied to hydrocarbons having more than five carbon atoms per molecule, under some circumstances it may be applied to aliphatic hydrocarbons having as many as six carbons atoms per molecule.

In the case of a normally liquid feed such as a $C_5$ or a $C_6$ aliphatic hydrocarbon mixture it would generally be preferred to effect the separation in a combined solvent extraction-fractional distillation tower in the manner known as "extractive distillation." In many cases it may be desirable to use such a method of absorption when operating on $C_4$ streams. Extractive distillation differs from gas scrubbing in that the feed is introduced at an intermediate point in a fractional distillation column which is reboiled at its base and refluxed at its top to provide a temperature gradient across the column.

In general we have found that for a given molecular weight, olefin hydrocarbons are more soluble in ortho anisidine than paraffin hydrocarbons. We have further found that in a given homologous series hydrocarbon solubility in ortho anisidine increases with increasing molecular weight. For example ethylene is more soluble than ethane and ethane is more soluble than methane. The mixture to which the process is applied may be a single paraffin and one or more olefin hydrocarbons, a single olefin and one or more paraffins, or mixture of olefins, a mixture of several olefins and several paraffins or a mixture of paraffins. The term "olefin" is intended to embrace open chain diolefins as well as open chain monoolefins.

Our invention may be employed to effect the separation of mixtures of paraffins or of mixtures of olefins. Such mixtures may be composed of different hydrocarbons having the same number of carbon atoms per molecule. Examples are: a mixture of normal and a branched chain paraffin such as normal butane and isobutane; a mixture of two different low-boiling aliphatic monoolefins such as a mixture if isobutylene and butene-1 which is impossible to resolve by ordinary fractional distillation; a mixture of butadiene with isobutylene or with butene-1 or with both isobutylene and butene-1 which mixtures cannot be separated by conventional fractionation. As pointed out above the present invention may also be used to separate mixtures of aliphatic hydrocarbons having differing numbers of carbon atoms per molecule, examples being the separation of methane from $C_2$ hydrocarbons, the separation of $C_2$ from $C_3$ hydrocarbons, etc. It will be obvious that it is possible to effect some of the separations mentioned by other means than the present invention. For example, the separation of normal butane from isobutane can be very easily accomplished by simple fractionation. Similarly the separation between $C_2$ and $C_3$ hydrocarbons may be effected readily by oil absorption.

Our invention is based on the discovery that ortho anisidine has an unusually high selectivity. This selectivity may be expressed in terms of the value of K ratio, K being defined for a mixture of hydrocarbons A and B in vapor-liquid equilibrium with liquid ortho anisidine as follows:

$$K_A = \frac{\text{mol fraction of A in vapor phase}}{\text{mol fraction of A in liquid phase}}$$

For ortho anisidine and mixtures of an aliphatic olefin and the corresponding aliphatic paraffin, K for the olefin has a relatively low value. As a result of the unexpectedly high selectivity of ortho anisidine and the high dissolving power of the solvent for the more unsaturated or higher molecular weight hydrocarbons the process of our invention assumes commercial significance.

Referring to the accompanying drawing, a mixture of propane and propylene is fed into the bottom of absorption tower A through line 1 controlled by valve 1A. Tower A is operated at 80 to 100° F. and at pressures between 10 pounds per square inch gauge and 120 pounds per square inch gauge. The gas mixture is intimately and countercurrently contacted with ortho anisidine in this tower which is equipped with bubble trays or other suitable means of effecting intimate contact. A propane-rich effluent is withdrawn from the top of tower A through line 2 regulated by valve 2A. Propylene-enriched ortho anisidine is withdrawn from the bottom of tower A through line 3 controlled by valve 3A and fed to the stripping tower B. Tower B is operated at atmospheric pressure and at temperatures between 80 and 100° F. Propylene-rich gas is withdrawn from the top of tower B through line 4 regulated by valve 4A. Hydrocarbon-lean ortho anisidine is withdrawn from the bottom of this tower by line 5 controlled by valve 5A and recycled to tower A for reuse. A portion of propylene-rich gas may be recycled to the absorption zone via line 6 controlled by valve 6A. Such recycling will still further enrich gas withdrawn through line 4 with respect to propylene.

Make-up ortho anisidine may be supplied to line 5 via line 7 controlled by valve 7A to make up for system losses.

Heat may be supplied to the bottom of absorption tower A by means of reboiler coil 9 and to the bottom of stripper tower B by means of reboiler coil 10. The application of heat to the bottom of column B serves to effect the removal of the dissolved propylene from the solvent. Application of heat to the bottom of column A serves to improve the separation by effecting at least partial removal of any dissolved propane from the solvent in the lower portion of the column. Normally the temperature in the bottom of column A is maintained at such a level by means of reboiler 9 that a part of the propylene is displaced from the solvent but as the displaced propane and propylene pass up the tower the propylene is redissolved by the cooler solvent encountered.

Use of reboiler 9 and return of stripped product via line 6 serve similar functions and either may be employed to the exclusion of the other or both may be employed at the same time. Use of both is preferred.

It is understood that suitable pumps will be employed to efficiently control the transmission of the liquid from one station to another and a complete commercial system would include numerous details not shown in the accompanying drawing.

Where the expense of condensing overhead vapors leaving the tops of the absorption and stripping columns is not prohibitive, as for example in the case of butene-butane feeds, these overhead vapors may be liquefied and a portion of the condensed liquids returned to the top of the columns A and B as reflux therefor, the introduction of reflux and the reboiling of the bottom of the columns serving to maintain a temperature gradient throughout the columns. It is preferred that conditions of operation be such that a single liquid phase be present and that overloading the extractant with hydrocarbon is avoided. In such case the feed to the absorber will be introduced at a point intermediate the point at which the lean solvent is introduced and the point at which the rich solvent is withdrawn. Operation in such manner is known as "extractive distillation." Such operation will usually be practical only in the case of $C_4$ and heavier hydrocarbon feeds.

In some cases it may be desirable to use a condensing coil in the top of the absorber or stripper or both to condense out any vaporized solvent and prevent its loss in the residue gas or in the gas taken overhead from the stripper. However ortho anisidine has a comparatively high boiling point—namely, 225° C. (437° F.)—so that its vapor pressure at ordinary operating temperatures in the range of 50 to 250° F. is so low that this precaution is generally not necessary.

To further clarify this invention the following specific examples are given:

*Example I*

Pure ethylene gas was contacted with o-anisidine until equilibrium was established at 60 pounds per square inch at 80° F. Under these conditions 100 cc. of o-anisidine dissolved 500 cc. of ethylene (calc. at NTP). Under the same conditions 100 cc. of o-anisidine dissolved only 75 cc. of methane.

*Example II*

A mixture of ethylene and methane is contacted with 100 cc. of o-anisidine while maintaining the pressure at 120 pounds per square inch gauge total pressure at 80° F. until equilibrium is established. The composition of the vapor phase is 50 mol per cent ethylene and 50 mol per cent methane. Under these conditions 500 cc. of ethylene and 75 cc. of methane are dissolved. Upon complete desorption of the dissolved gases, the composition of the effluent is 87 mol per cent ethylene and 13 mol per cent methane.

*Example III*

A mixture of propylene and propane was contacted with o-anisidine at 80° F. at a pressure of 68 pounds per square inch gauge until equilibrium was established. Under these conditions the composition of the undissolved gases was 45 mol per cent propylene and 55 mol per cent propane, and the composition of gases dissolved in the liquid phase was 57 mol per cent propylene and 43 mol per cent propane.

From the foregoing it will be seen that the present invention provides a very advantageous method of effecting resolution of aliphatic hydrocarbon mixtures particularly those mixtures which are normally gaseous or which can readily be maintained in the gaseous phase. The process of the present invention is simple and efficient. The solvent is unusually selective for the hydrocarbons to be separated which is highly advantageous since it permits use of a lower rate of introduction of solvent to the absorption tower. The solvent is comparatively cheap and readily available. The solvent has a high boiling point and a correspondingly low vapor pressure at the temperatures at which the process is generally conducted. The solvent displays good stability under the conditions of operation. Many other advantages of the process of our invention will be realized by those skilled in the art.

We claim:

1. The method of effecting separation of methane from an aliphatic $C_2$ hydrocarbon selected from the group consisting of ethane and ethylene which comprises contacting a mixture of methane and said $C_2$ hydrocarbon in the gaseous state with a solvent consisting of liquid ortho anisidine and thereby effecting preferential solution of the $C_2$ hydrocarbon portion of said mixture in said ortho anisidine.

2. The process of claim 1 wherein said contacting is carried out at a temperature of from 80 to 100° F. and at a pressure of from 10 to 120 pounds per square inch gauge and wherein the dissolved $C_2$ hydrocarbon portion is stripped from solution in said ortho anisidine at a temperature of from 80 to 100° F. and at substantially atmospheric pressure.

3. The method of effecting separation of methane from ethylene which comprises contacting a gaseous mixture of methane and ethylene with a solvent consisting of liquid ortho anisidine and thereby effecting preferential solution of the ethylene in said ortho anisidine.

4. A method of separating ethylene from a mixture containing methane, ethylene and ethane which comprises introducing such a mixture in gaseous phase into a low point of a solvent extraction zone for passage upwardly therethrough, introducing a solvent consisting of liquid ortho anisidine into a high point of said zone and flowing same downwardly therein in intimate countercurrent contact with the upwardly flowing gases thereby effecting preferential solution of the ethylene in said ortho anisidine, withdrawing from a high point in said zone an ethylene-denuded mixture of methane and ethane, withdrawing from a low point of said zone said ortho anisidine containing ethylene dissolved therein, and recovering said ethylene from said solution.

5. A method of effecting separation of methane from ethane which comprises contacting a gaseous mixture of methane and ethane with a solvent consisting of liquid ortho anisidine and thereby effecting preferential solution of the ethane in said ortho anisidine.

GARDNER C. RAY.
E. O. BOX, Jr.

REFERENCES CITED

The following references are of record in the file of this patent:

UNITED STATES PATENTS

| Number | Name | Date |
|---|---|---|
| 2,083,893 | Clarke | June 15, 1937 |
| 2,205,996 | Van Wijk | June 25, 1940 |
| 2,215,915 | Cope et al. | Sept. 24, 1940 |
| 2,381,092 | Wilson | Aug. 7, 1945 |

FOREIGN PATENTS

| Number | Country | Date |
|---|---|---|
| 466,980 | Great Britain | June 9, 1937 |